Nov. 3, 1959 L. PETERSEN 2,911,061
APPARATUS FOR COOLING HOT KILN GASES
Filed Oct. 2, 1957 3 Sheets-Sheet 1

INVENTOR.
Louis Petersen
BY
Pennie Edmonds Morton Barrows Taylor
ATTORNEYS

Nov. 3, 1959     L. PETERSEN     2,911,061
APPARATUS FOR COOLING HOT KILN GASES

Filed Oct. 2, 1957     3 Sheets-Sheet 3

INVENTOR.
BY Louis Petersen
ATTORNEYS

United States Patent Office 2,911,061
Patented Nov. 3, 1959

2,911,061

APPARATUS FOR COOLING HOT KILN GASES

Louis Petersen, Rye, N.Y., assignor to F. L. Smidth & Co., New York, N.Y., a corporation of New Jersey Application October 2, 1957, Serial No. 687,780

6 Claims. (Cl. 183—13)

This invention relates to the removal of dust particles from exit gases issuing from kilns, such as rotary kilns, in which cement raw materials, lime, or ores are burned and, more particularly, the invention is concerned with a novel apparatus for separating dust particles from such kiln exit gases.

The exit gases from rotary kilns frequently have temperatures ranging from 500° to 700° C., depending upon the length of the kiln and the composition of the material to be burned, and it is common practice to cool the gases and pass them through a filter before permitting them to escape into the atmosphere. The cooling devices used for the purpose may take the form of a cooler, in which the gases flow through pipes subjected to external air-cooling, and may also include preheating means, in which the raw material is carried in suspension in the gases in one or more stages and is preheated by abstracting heat from the gases and thereby cooling them. The filters heretofore used have been of either the bag or electrostatic types and many different forms of both such filters are known.

With filters of the kinds now in use, a problem presented is that of obtaining the desired filter efficiency without subjecting the filters to damage because of the high temperature of the exit gases. With a bag filter of the materials now in use, the exit gases should be cooled to about 130° to 150° C. before entering the filter, while with an electrostatic filter, the exit gases should be cooled to about 350° to 400° C. Coolers, in which the gases are cooled while traveling through pipes, are of large dimensions and involve frequent interruptions of operation, because the pipes traversed by the gases become plugged by dust particles depositing on their inner surfaces and require cleaning as frequently as once in 8 or 10 hours of operation. While attempts have been made to keep the pipes clean by passing cleaning bodies therethrough, the use of such bodies subjects the pipes to heavy wear and reduces their useful life.

The present invention is directed to a provision of an apparatus for separating dust particles from exit kiln gases by means of a filter and, at the same time, lowering the temperature of the gases so that they do not injure the filter. In the operation of the apparatus, the gases are cooled by a liquid injected into them and the amount of liquid employed is controlled and varied with the temperature of the gases, which have been cooled and are on their way to the filter. Also, in the apparatus, gases, which have been cooled by injection of liquid into them but still have an excessive temperature, are diverted from the filter so long as the dangerous temperature persists.

The apparatus of the invention may take various forms and, in all cases, includes a cooling chamber, through which the gases travel on their way from the kiln to the filter and in which a liquid is atomized into the gases. The cooling chamber may be used alone or in association with one or more suspension preheaters, in which the gases are preliminarily cooled by raw material introduced into the gases and carried along for a period in suspension therein. In one form, the cooling chamber is a stationary cooling tower provided with removable nozzles atomizing a liquid at high pressure into the gases flowing through the tower. In another form, the chamber is a cooling drum mounted for rotation on a horizontal axis and containing a charge of loose bodies, which act to maintain the inner surface of the drum clean and prevent the adhesions of dust particles thereto.

For a better understanding of the invention, reference may be made to the accompanying drawings, in which.

Figure 1:
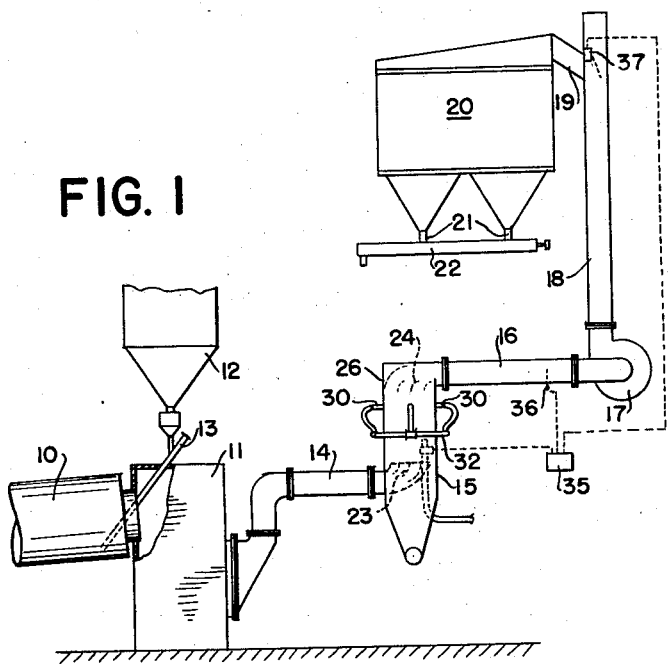
Fig. 1 is a diagrammatic view of a form of apparatus embodying the invention and including a cooling tower.
Figure 2:
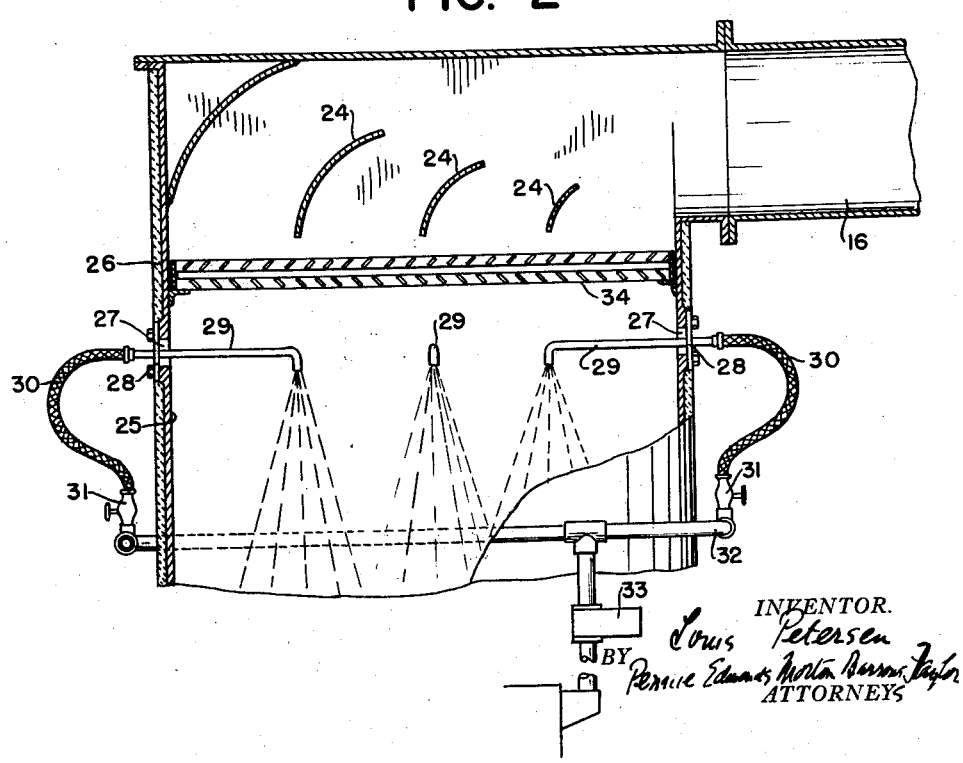
Fig. 2 is a vertical sectional view on an enlarged scale of the cooling tower employed in the apparatus of Fig. 1.

The installation shown in Fig. 1 comprises a rotary kiln 10 having its upper end projecting into a smoke chamber 11 and the raw material to be burned in the kiln is supplied from a hopper 12 to a pipe 13, which extends through the smoke chamber and into the end of the kiln. The exit gases from the kiln pass from the smoke chamber through the pipe 14 to the inlet of a stationary cooling tower 15, which has an outlet at its upper end connected by a pipe 16 to the intake of fan 17. A pipe 18 leads from the outlet of the fan and a branch pipe 19 leads from pipe 18 to the inlet of an electrostatic filter 20 having a pair of discharge outlets 21, through which separated dust particles are discharged into a screw conveyor 22. Within the cooling tower 15 opposite the inlet opening are mounted a plurality of baffles indicated at 23 and a group of similar baffles 24 are mounted within the tower adjacent the outlet of the tower. The baffles 23, 24 distribute the gases uniformly through the cross-sectional area of the tower and reduce the resistance to flow of the gases through the tower outlet.

The side walls 25 of the tower are of metal with an outside layer 26 of insulation and the walls have openings 27 closed by plates 28 bolted in place and supporting nozzles 29, which extend radially toward the central axis of the tower. The nozzles are connected by flexible pipes 30 and valves 31 to a header 32, which surrounds the tower and is supplied with water through a valve controlled by a regulator indicated at 33. The nozzles 29 are of such construction and so mounted in the tower that the water atomized therefrom does not strike the inner surface of the tower and the water is supplied to the nozzles at a high pressure of up to 50 to 60 atmospheres, so that the water is thus so finely atomized that it evaporates almost instantaneously within the tower. The insulation maintains the metal walls of the tower at temperatures such as to prevent any moisture depositing on the inner surface of the tower and retaining particles of dust. Above the nozzles are mounted a pair of eliminators 34, which have the form of grates with their bars inclined in opposite directions to the horizontal and the top edges of the bars of the lower grate opposite the spaces between the lower edges of the bars of the upper grate. The eliminators intercept any drops of water, which may be contained in the exit gases about to enter the pipe 16.

The action of the regulator 33, which determines the amount of water supplied to the header 32, is controlled by a thermostat 35 having a feeler 36 lying within the stream of gases flowing through the pipe 16. The thermostat also controls a damper 37 in the pipe 18, which cuts off the flow of gases therefrom into pipe 19. When a rise in temperature occurs in the gases, which are flowing through pipe 16 and have been cooled in the tower 15, the thermostat 35 operates the regulator 33 to cause a greater quantity of water to be atomized into the gases in the tower, so that an increased cooling action is obtained. At the same time, the thermostat operates the damper 37 to close the opening into the branch 19 and thus divert the gases from the filter 20 and permit them to escape through pipe 18 to the atmosphere. If the temperature in the gases flowing through pipe 16 falls below the value, for which the thermostat has been set, the thermostat acts on the regulator 33 to reduce the amount of water atomized into the tower and opens the damper 37 to permit resumption of flow of gases to the filter.

Figure 3:
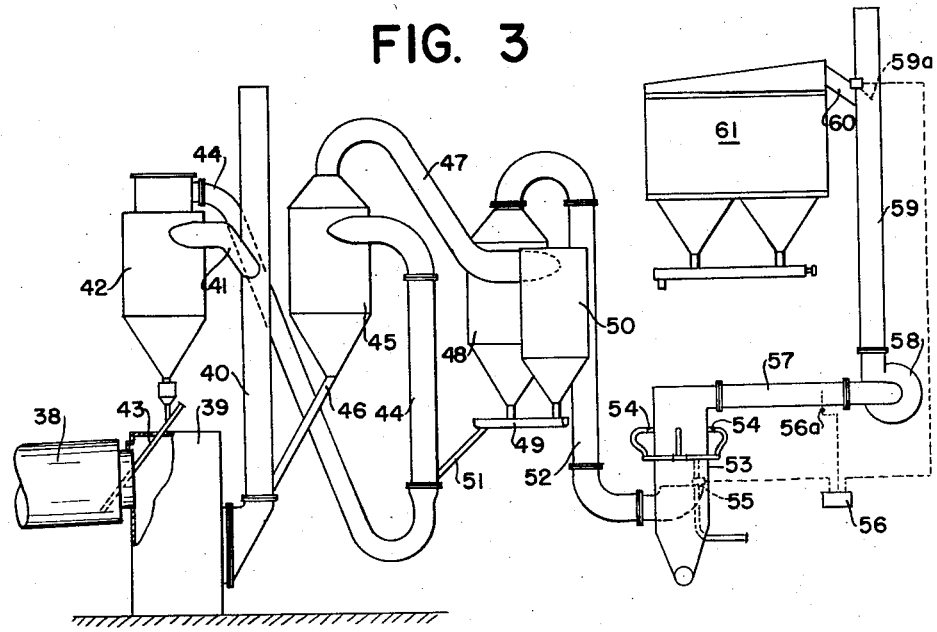
Fig. 3 is a diagrammatic view of another form of apparatus embodying the invention and including suspension preheaters and a cooling tower.
Figure 4:
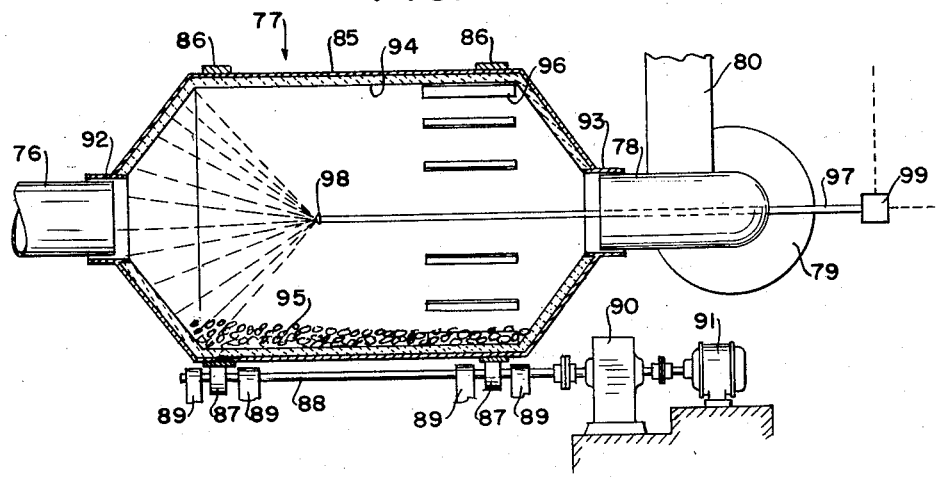
Fig. 4 is a vertical sectional view of a rotary cooling drum, which may be used in the apparatus of the invention.

The installation shown in Fig. 3 includes a rotary kiln 38 having its upper end entering a smoke chamber 39 and the gases from the chamber enter a stack 40, from which a pipe 41 leads to the tangential inlet of a cyclone separator 42 having a bottom outlet for discharge of separated solids to a pipe 43 leading through the smoke chamber into the upper end of the kiln. The separator has a top outlet for gases, from which the connection 44 leads to the tangential inlet of a second cyclone preheater 45 having a bottom outlet for discharge of separated solids into a pipe 46 leading into the stack 40 just above its connection to the chamber 39. The preheater 45 has a top outlet for gases connected by a pipe 47 to the tangential inlet of a cyclone separator 48 having a bottom outlet for discharging separated solids into a screw conveyor 49. Raw material to be burned is supplied from a hopper 50 to the conveyor 49 and the mixture of raw material and solids from the separator 48 is delivered by the conveyor into a pipe 51 leading into the vertical section of the connection 44. The separator 48 has a top outlet for gases connected by a pipe 52 to the inlet of a cooling tower 53, which is similar in all respects to the tower 15 and includes a plurality of nozzles 54 supplied with water through a valve controlled by a regulator 55 operated by a thermostat 56. The outlet from the tower is connected by a pipe 57 to the inlet of a fan 58 having an outlet connected to a pipe 59, from which a branch 60 leads to the inlet of an electrostatic filter 61. The flow of gases from pipe 59 through branch 60 into the filter is controlled by a damper 59a operated by the thermostat 56, the feeler 56a of which is responsive to the temperature of the gases flowing through pipe 57.

In the installation shown in Fig. 3, the raw material to be burned in the kiln is preheated in two stages by traveling in suspension in the exit gases from the kiln and the gases are thereby reduced in temperature before their entrance into the cooling tower. The gases, accordingly, require less cooling in the tower and heat is saved because of the preheating of the raw material.

Figure 5:
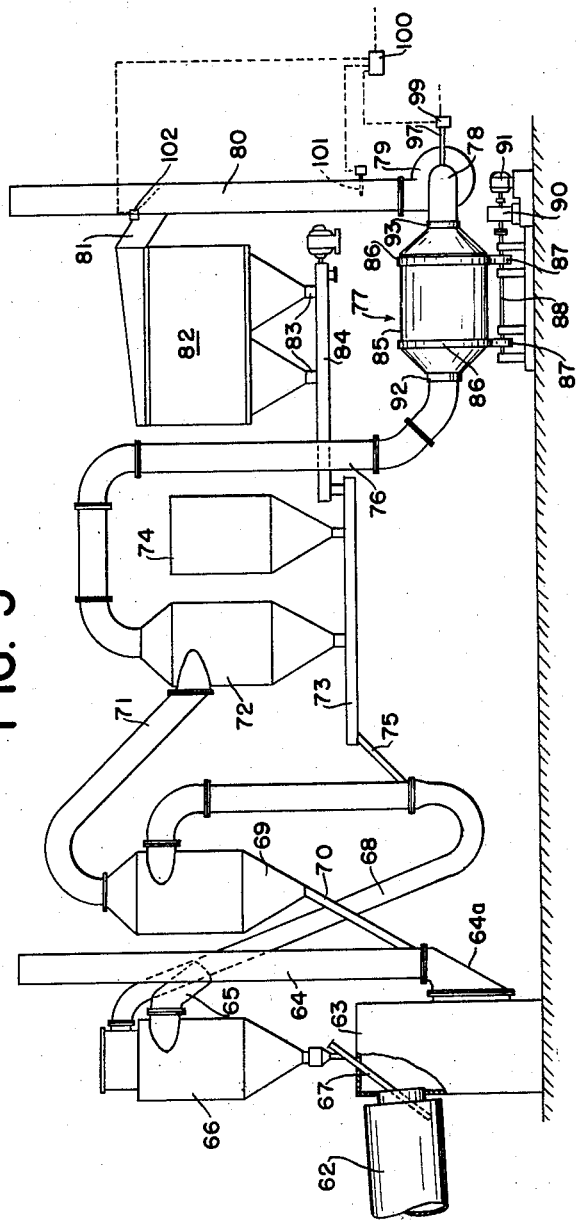
Fig. 5 is a diagrammatic view of another form of apparatus embodying the invention and including suspension preheaters and a cooling drum.

In the installation shown in Fig. 5, the upper end of the rotary kiln 62 enters a smoke chamber 63 and the gases leave the chamber through the riser pipe 64 and pass through a branch 65 and enter a suspension preheater 66 through its tangential inlet. The preheater has a bottom outlet for solids connected to a pipe 67, which leads through the smoke chamber 63 into the upper end of the kiln. A connection 68 leads from the gas outlet at the top of the preheater 66 to the tangential inlet of a suspension preheater 69 having a bottom outlet for solids, from which a pipe 70 leads into the riser pipe 64 close to its connection to the chamber 63. The gas outlet at the top of preheater 69 is connected by a pipe 71 to the tangential inlet of a cyclone separator 72 having a bottom outlet, through which separate solids pass to a screw conveyor 73. Raw material to be burned is supplied from a hopper 74 to the conveyor 73 and the mixture of raw material and separated solids is delivered by conveyor 73 to a pipe 75 leading into the vertical section of connection 68.

The gas outlet at the top of a separator 72 is connected by a pipe 76 to the inlet of a cooling drum 77 having an outlet connected by a pipe 78 to the intake of a fan 79. The outlet of the fan is connected to a stack 80, from which a branch 81 leads to the inlet of a filter 82, which may be of the bag type. The filter has a pair of discharge outlets 83 delivering collected solids into a screw conveyor 84, which delivers the material to the screw conveyor 73 for mixture with the raw materials and the solids issuing from separator 72.

The cooling drum 77 has a cylindrical central section encircled by tires 86 running on friction rollers 87 on a shaft 88 supported on bearings 89 and driven through a gear reducer 90 by a motor 91. The pipe 76 leading gases to the drum enters a cylindrical sleeve 92 surrounding the inlet at one end of the drum and the pipe 78 leading gases from the drum enters a similar sleeve 93 surrounding the drum outlet. The drum has a lining 94 and contains a charge of loose cleaning bodies 95, which may be steel balls. Preferably, the drum is provided with internal lifters 96, which raise dust particles collecting in the drum and discharge them into the path of gases leaving the drum through the exist sleeve 93.

A water pipe 97 extends axially through pipe 78 and the outlet sleeve 93 into the interior of the drum and is provided at its inner end with a spray nozzle 98. The construction is such that the pipe 97 may be readily removed for replacement of the nozzle in the event that the latter becomes clogged. The flow of water through pipe 97 to nozzle 98 is controlled by a valve actuated by a regulator 99.

In the installation of Fig. 5, the regulator 99 is controlled by a thermostat 100 having a feeler 101 responsive to the temperature of the gases passing through pipe 80. The thermostat also operates a damper 102, which controls the entrance into pipe 81 and thus determines the amount of gases entering the filter 82.

In the operation of the installation of Fig. 5, the raw material and the solids collected in the filter and the cyclone separator 72 are carried in suspension in the stream of exit gases leaving the kiln and are preheated in two stages by abstraction of heat from the gases. The gases are thereby preliminarily cooled and they then enter the cooling drum 77. In the drum, the gases are further cooled by the water issuing from the nozzle 98. Since the cleaning bodies 95 in the drum continually remove any accumulation of dust on the drum lining, the cooling water may be atomized into the drum in larger drops and at lower pressure than in the stationary cooling tower. Also, in the drum, the water spray may strike the drum walls, since they are continually maintained clean by the loose bodies. While the cooling drum is more expensive to install and operate than a stationary cooling tower, a greater cooling effect is obtainable in the drum so that it is preferable for use with a bag filter.

In the installation shown in Fig. 5, the exit kiln gases are reduced to an unusually low temperature because of the use of suspension preheaters in addition to the cooling drum. In some installations, the suspension preheaters may be dispensed with, in which event the drum inlet will be connected to the smoke chamber by a connection which may conveniently extend to the drum inlet from the elbow fitting 64a by which the gases are led from the smoke chamber 63 to the riser pipe 64. As in the installations of Figs. 1 and 3, the thermostat 100 in the Fig. 5 installation functions to increase the amount of water supplied to the drum for cooling purposes when the temperature of the gas leaving the drum increases. At the same time, an increase in the temperature of the gases causes the thermostat to adjust the damper 102 to divert an increased proportion of the gases from the filter.

I claim:

1. An apparatus for separating dust particles from the exit gases from a kiln, which comprises a drum mounted for rotation on a substantially horizontal axis and containing a charge of loose bodies for maintaining the inner surface of the drum clean, the drum having axial inlet and outlet openings at opposite ends, means for rotating the drum, means for conducting gases from the gas outlet end of the kiln to the drum inlet, a filter for removing dust particles from gases, a connection for conducting gases from the drum outlet to the filter, means for causing gases from the kiln to flow through the conducting means, drum, and connection to the filter, means for atomizing a liquid into the gases flowing through the drum, a regulator controlling the amount of liquid atomized, means for diverting from the filter gases flowing through the connection, and means responsive to the temperature of the gases issuing from the drum for controlling the action of the regulator and the diverting means.

2. The apparatus of claim 1, in which the conducting means include means for introducing raw material to be burned into the gases in the conducting means, the material being carried along in suspension in the gases and being preheated while cooling the gases, and means for separating the preheated material from the gases.

3. The apparatus of claim 2, in which the conducting means include means for introducing the separated preheated material into the gases for further travel in suspension therein and further heating of the material and cooling of the gases, and means for separating the material from the gases after the second travel of the material in suspension in the gases.

4. The apparatus of claim 1, in which lifters are mounted inside the drum on the drum wall.

5. The apparatus of claim 2, in which a connection leads from the filter to the conducting means and dust particles from the filter pass through the connection into the gases in the conducting means.

6. The apparatus of claim 5, which includes a vessel containing a supply of raw material and having an outlet, means connecting the outlet of the vessel to the conducting means for passage of raw material from the vessel into the gases in the conducting means, and a connection for passage of dust particles from the filter into the connecting means.

References Cited in the file of this patent

UNITED STATES PATENTS

| | | |
|---|---|---|
| 1,880,017 | Harmon | Sept. 27, 1932 |
| 2,368,828 | Hanson et al. | Feb. 6, 1945 |
| 2,667,941 | Ekstrom | Feb. 2, 1954 |
| 2,776,725 | Wood | Jan. 8, 1957 |
| 2,778,442 | Jenkins et al. | Jan. 22, 1957 |